(12) United States Patent
Cantrell

(10) Patent No.: US 10,462,394 B1
(45) Date of Patent: Oct. 29, 2019

(54) DIGITAL PIXEL IMAGER WITH DUAL BLOOM STORAGE CAPACITORS AND CASCODE TRANSISTORS

(71) Applicant: RAYTHEON COMPANY, Waltham, MA (US)

(72) Inventor: Joshua J. Cantrell, Santa Barbara, CA (US)

(73) Assignee: RAYTHEON COMPANY, Waltham, MA (US)

( * ) Notice: Subject to any disclaimer, the term of this patent is extended or adjusted under 35 U.S.C. 154(b) by 0 days.

(21) Appl. No.: 16/032,096

(22) Filed: Jul. 11, 2018

(51) Int. Cl.
| | |
|---|---|
| H04N 5/335 | (2011.01) |
| H04N 5/355 | (2011.01) |
| H04N 5/3745 | (2011.01) |
| H04N 5/374 | (2011.01) |
| H04N 5/378 | (2011.01) |
| H04N 5/359 | (2011.01) |

(52) U.S. Cl.
CPC ......... *H04N 5/3559* (2013.01); *H04N 5/3355* (2013.01); *H04N 5/359* (2013.01); *H04N 5/378* (2013.01); *H04N 5/3742* (2013.01); *H04N 5/37455* (2013.01)

(58) Field of Classification Search
CPC ...................................... H04N 5/359
See application file for complete search history.

(56) References Cited

U.S. PATENT DOCUMENTS

| | | | |
|---|---|---|---|
| 9,167,180 B1 | 10/2015 | Williams et al. | |
| 9,628,105 B1 | 4/2017 | Veeder | |
| 9,942,497 B2 * | 4/2018 | Ikeda | .................. H04N 5/3598 |
| 10,290,673 B1 * | 5/2019 | Wang | ................ H01L 27/14643 |
| 2009/0101798 A1 * | 4/2009 | Yadid-Pecht | ........ H04N 5/3532 |
| | | | 250/208.1 |

OTHER PUBLICATIONS

Abbasi, et al. "A PFM-Based Digital Pixel With an Off-Pixel Residue Measurement for Small Pitch FPAs" IEEE Transactions on Circuits and Systems—II: Express Briefs, vol. 64, No. 8, Aug. 2017, 5 pages.

Tyrrell, et al. 1. "Design Approaches for Digitally Dominated Active Pixel Sensors: Leveraging Moore's Law Scaling in Focal Plane Readout Design" Proc. of SPIE vol. 6900 (2008) 16 pages.

* cited by examiner

*Primary Examiner* — Gary C Vieaux
(74) *Attorney, Agent, or Firm* — Cantor Colburn LLP

(57) ABSTRACT

An integration capacitor network for connection to a photocurrent source includes: an input; a first path connected between the input and a reset voltage, the first path including a first integration capacitor and a first cascode transistor, the first cascode transistor coupled between the input and the first integration capacitor; and a second path connected between the input and the reset voltage, the second path including a second integration capacitor and a second cascode transistor, the second cascode transistor coupled between the input and the second integration capacitor. Gates of the first and second cascode transistors are connected to a reference voltage and charge is accumulated on the first integration capacitor until a voltage on the first integration capacitor exceeds the reference voltage and then charge is accumulated on the second integration capacitor.

20 Claims, 8 Drawing Sheets

DIGITAL PIXEL IMAGER WITH DUAL BLOOM STORAGE CAPACITORS AND CASCODE TRANSISTORS

BACKGROUND

The present disclosure relates to a digital pixel imager and, in particular, a digital pixel circuit that includes two bloom storage capacitors.

In legacy analog imagers, particularly infrared imagers, photo-current from a detector diode is integrated by a well capacitor coupled to the detector diode, and then once per video frame, the voltage or charge of each well capacitor is transferred to a down-stream analog-to-digital converter (ADC), where the voltage is converted to a binary value. Pixel sizes continue to shrink and the ratio of well capacitor to pixel area shrinks disproportionately more. Simultaneously, there is a demand by consumers for increased Signal-to-Noise Ratio (SNR) which can be realized by increasing effective well capacitance.

In-pixel ADC imagers are used to address this problem associated with decreasing pixel size. In particular, in-pixel ADC imaging improves photo-charge capacity for infrared imaging and other applications as the size of pixels continues to decrease. A good in-pixel ADC design can store nearly all of the available photo-charge from a detector diode and thus improve SNR to near theoretical limits. A common method of integration for in-pixel ADC circuits uses a quantizing analog front end circuit which accumulates charge over a relatively small capacitor, trips a threshold and is then reset. This pattern is repeated as more photo-current integrates.

An example of an in-pixel ADC circuit 100 is illustrated in FIG. 1. Charge from a photo-diode 110 is accumulated over an integration capacitor 115. As charge is accumulated across the integration capacitor 115 it is compared to a threshold voltage (Vref) by a comparator 120. When the voltage across the integration capacitor 115 (referred to as Vint herein) exceeds Vref, the circuit 100 is reset via a reset switch 130 that receives a control signal Reset. During a reset, a voltage equal to the difference between Vref and Vreset is subtracted from the integrating capacitor 115.

Control of the flow of current from the photo-diode 110 is controlled by an injection transistor 112. The gate of the injection transistor 112 is coupled to a bias voltage Vbias. The level of this voltage can be selected by the skilled artisan and is used, in part, to keep the photo-diode in reverse bias where the voltage at node 114 is lower than the diode supply voltage Vdiode. If the voltage at node 114 exceeds Vbias, current created in the photo-diode 110 is allowed to pass through the injection transistor 112 for accumulation by the integration capacitor 115.

Each reset event is accumulated (counted) with a digital counter circuit 135. At each frame, a "snapshot" of the contents of the digital counter 135 is copied into a register or memory and read out, line by line. This circuit 100 operates to exponentially increase the well capacity $Q_{INT}$ of the integration capacitor 115 by a factor of $2^N$, where N is the size of the digital counter 135. Thus, by conserving the photo-charge relationship within a frame period, this type of read-out integrated circuit 100 may achieve improved signal-to-noise ratio.

After the integration time expires, any residual charge accumulated on the integration capacitor 115 can be read out by, for example, a single slope ADC or any other type of ADC. Such operations are known in the prior art.

The example in-pixel ADC circuit 100 illustrated in FIG. 1 is an asynchronous circuit. In asynchronous in-pixel ADCs, the comparator reset event occurs as soon as the voltage on the integrating capacitor 115 crosses the comparator threshold.

SUMMARY

According to a first embodiment, an integration capacitor network for connection to a photo-current source is disclosed. The network of the first embodiment includes: an input; a first path connected between the input and a reset voltage, the first path including a first integration capacitor and a first cascode transistor, the first cascode transistor coupled between the input and the first integration capacitor; and a second path connected between the input and the reset voltage, the second path including a second integration capacitor and a second cascode transistor, the second cascode transistor coupled between the input and the second integration capacitor. In this embodiment gates of the first and second cascode transistors are connected to a reference voltage and charge is accumulated on the first integration capacitor until a voltage on the first integration capacitor exceeds the reference voltage and then charge is accumulated on the second integration capacitor.

In one embodiment, in any prior disclosed integration capacitor network, the first path includes a first shorting switch that, when closed, short circuits a source and a drain of the first cascode transistor.

In one embodiment, in any prior disclosed integration capacitor network, the first path includes a first reset switch coupled in parallel with the first integration capacitor such that, when closed, the first reset switch causes charge to be subtracted from the first integration capacitor.

In one embodiment, in any prior disclosed integration capacitor network, the first path further includes a first secondary reset switch coupled between the first cascode transistor the first integration capacitor.

In one embodiment, in any prior disclosed integration capacitor network, the second path further includes: a second shorting switch that, when closed, short circuits a source and a drain of the second cascode transistor; a second reset switch coupled in parallel between with the second integration capacitor such that, when closed, the second reset switch causes charge to be subtracted from the second integration capacitor; and a second secondary reset switch coupled between the second cascode transistor the second integration capacitor.

In one embodiment, in any prior disclosed integration capacitor network, the network further includes: an output; a first output connection switch coupled between the first integration capacitor and the output; and a second output connection switch coupled between the second integration capacitor and the output.

In one embodiment, in any prior disclosed integration capacitor network, the network further includes: a residual output switch coupled between the first integration capacitor and the second integration capacitor.

In one embodiment, a digital pixel is disclosed. The pixel includes a photo-current source; a comparator; a counter coupled to an output of the comparator; a controller coupled to the output of the comparator; and an integration capacitor network. In this embodiment, the integration capacitor network includes an input; a first path connected between the input and a reset voltage, the first path including a first integration capacitor and a first cascode transistor, the first cascode transistor coupled between the input and the first integration capacitor; a second path connected between the input and the reset voltage, the second path including a second integration capacitor and a second cascode transistor, the second cascode transistor coupled between the input and the second integration capacitor; and an output connected to the comparator. In this embodiment, the gates of the first and second cascode transistors are connected to a reference voltage and the controller is configured to cause the integration capacitor network to accumulate charge on the first integration capacitor until a voltage on the first integration capacitor exceeds the reset voltage and then charge is accumulated on the second integration capacitor.

In one embodiment, in any prior disclosed digital pixel, the first path includes a first shorting switch that, when closed, short circuits a source and a drain of the first cascode transistor.

In one embodiment, in any prior disclosed digital pixel, the first path includes a first reset switch coupled in parallel between with the first integration transistor that, when closed, the first reset switch causes charge to be subtracted from the first integration capacitor.

In one embodiment, in any prior disclosed digital pixel, the first path further includes a first secondary reset switch coupled between the first cascode transistor the first integration capacitor.

In one embodiment, in any prior disclosed digital pixel, the controller is configured to cause: the first shorting switch and the first secondary reset to be closed while voltage on the first integration capacitor is below the reset voltage; the first reset switch to be open while the voltage on the first integration capacitor is below the reset voltage; the first reset switch to close after the voltage on the first integration capacitor exceeds the reset voltage; and the first secondary reset switch to open after the voltage on the first integration capacitor exceeds the reset voltage.

In one embodiment, in any prior disclosed digital pixel, the second path further includes: a second shorting switch that, when closed, shorts a source and a drain of the second cascode transistor; a second reset switch coupled in parallel with the second integration capacitor such that, when closed, the second reset switch causes charge to be subtracted from the second integration capacitor; and a second secondary reset switch coupled between the second cascode transistor the second integration capacitor.

In one embodiment, in any prior disclosed digital pixel, the controller causes: the second secondary reset to be closed until a voltage on the second integration capacitor exceeds the reset voltage.

In one embodiment, in any prior disclosed digital pixel, the pixel further includes: a first output connection switch coupling the first integration capacitor to the output after the voltage on the first integrating capacitor exceeds the reference voltage; and a second output connection switch coupling the second integration capacitor to the output before the voltage on the first integrating capacitor exceeds the reference voltage.

In one embodiment, in any prior disclosed digital pixel, the pixel further includes a residual output switch coupled between the first and second integrating transistors that connects the first and second integrating transistors together and is closed after an integration period expires to couple both the first and second integrating transistors to the output to read out a residual charge on the first and second integrating transistors.

In one embodiment, a method of operating a digital pixel is disclosed. The method includes: storing charge from a photo-current source in a first integration capacitor until a voltage across the first integration capacitor exceeds a reference voltage; storing charge from the photo-current source in a second integration capacitor after the voltage in the first integration capacitor exceeds the reference voltage; while storing charge in the second integration capacitor, subtracting voltage from the first integration capacitor.

In one embodiment, in the method of any prior embodiment, charge is stored in the second integration capacitor until a voltage across the second integration capacitor exceed the reference voltage.

In one embodiment, in the method of any prior embodiment, the method further includes: after subtracting voltage from the first integration capacitor storing charge from the photo-current source in the first integration capacitor after the voltage in the second integration capacitor exceeds the reference voltage; and while storing charge in the first integration capacitor, subtracting voltage from the second integration capacitor.

In one embodiment, in the method of any prior embodiment, the method further includes: after expiration of an integration period, stopping storing charge on both the first and second integration capacitors; shorting the first and second integration capacitors together; and reading out residual charge on the first and second integration capacitors.

Additional features and advantages are realized through the techniques of the present invention. Other embodiments and aspects of the invention are described in detail herein and are considered a part of the claimed invention.

BRIEF DESCRIPTION OF THE SEVERAL VIEWS OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Disclosed herein is a digital pixel integration network that includes two capacitors. This network, as more fully described below, can improve the operation of an imager utilizing a digital pixel.

Figure 1:
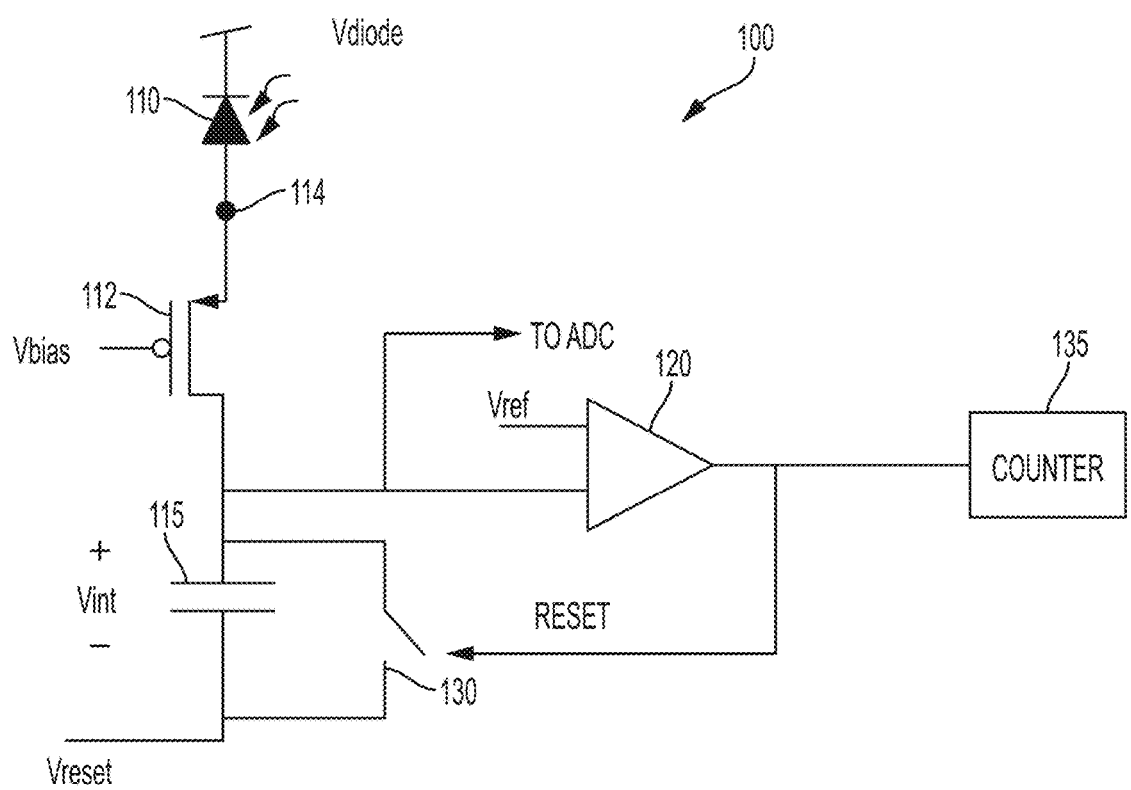
FIG. 1 is a schematic diagram illustrating a prior art in pixel analog-to-digital converter (ADC) circuit.
Figure 2:
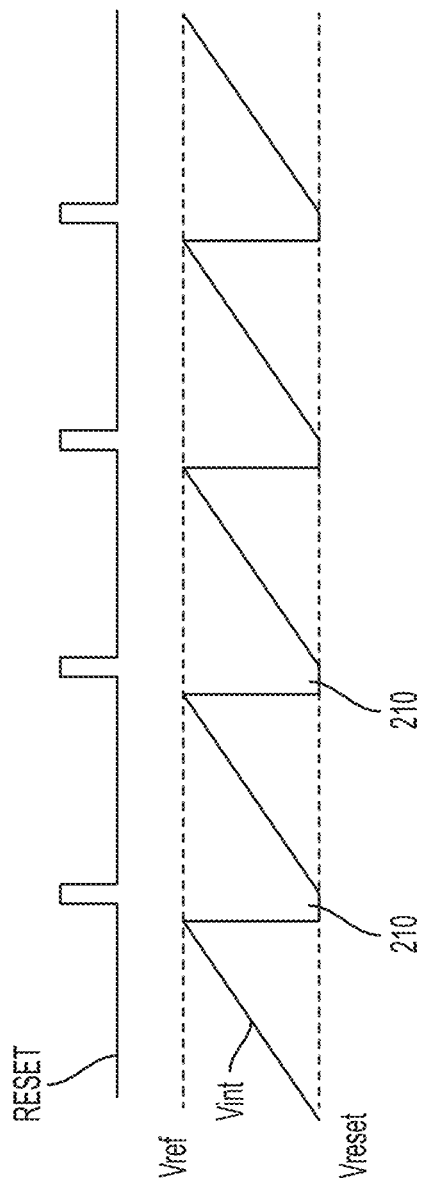
FIG. 2 is a graph illustrating voltage levels corresponding to operation of the ADC circuit of FIG. 1.

For example, FIG. 2 is waveform diagram illustrating the various voltage or signal values during operation of the circuit in FIG. 1. As can be seen during each reset event 210, the integration capacitor 115 is not integrating photo-current from the photodiode 110. The short durations when reset events are occurring are inconsequential at low photo-current levels, but become an important limiter of accuracy as photo-current nears maximum levels for a given application or configuration. Thus, the duration of the reset event can contribute to a loss of accuracy of the ADC function. Further, it shall be understood that the reset event 210 needs to have at least a minimum duration to insure that the integration capacitor 115 has time to settle before the next cycle begins.

Disclosed herein is a system that includes two integration (or bloom) capacitors. In general, the system will accumulate charge in a first capacitor until a reference voltage is reached. As above, the first capacitor is then discharged and a counter incremented. However, in contrast to the above, immediately following the threshold crossing, charge is directed to and collected in a second capacitor. This can serve to reduce the duration of or eliminate the reset events 210 shown above. It will be understand that the shape of the pulses on the Reset signal can be inverted depending on the specific hardware implementation.

As will be understood by the skilled artisan after reviewing the disclosure herein, embodiments of the integration capacitor network disclosed herein may achieve one of a reduction in the size, power, and complexity required for an imager with clocked residue digital pixels. Reduced size provides for use in higher resolution, smaller pixel imagers. Reduced power increases applicability in cryo-cooled infrared applications. The integration capacitor network disclosed is applicable to both clocked comparator and asynchronous comparator digital pixel designs. Further, locally buffering the input signals in the pixel unit-cell can allow for optimized circuit frequency response. It shall be understood that the integration capacitor network disclose herein can be used in direct injection (DI) unit cells, buffered DI unit cells, Si-PIN unit cells and CTIA (capacitive transimpedance amplifier) unit cells.

In more detail but still speaking in general terms, a photo-detecting source produces a current is connected to the integration capacitor network. The integration capacitor network integrates the charge and, when connected to a comparator/counter, a number of "counts" for each time a threshold is crossed is created. The integration capacitor network also stores any residual charge that may be accrued during an integration period and that does not exceed threshold.

The integration capacitor network can subtract a fixed quantity of integrated charge (e.g., by a reset). The integration capacitor network utilizes two cascoded integration capacitors to continuously integrate charge, even during one's reset in a digital pixel/counter. This allows for a variable reset time to manage pixel array current transients and supports accurate residue readout by shorting the two capacitors before readout.

Figure 3:
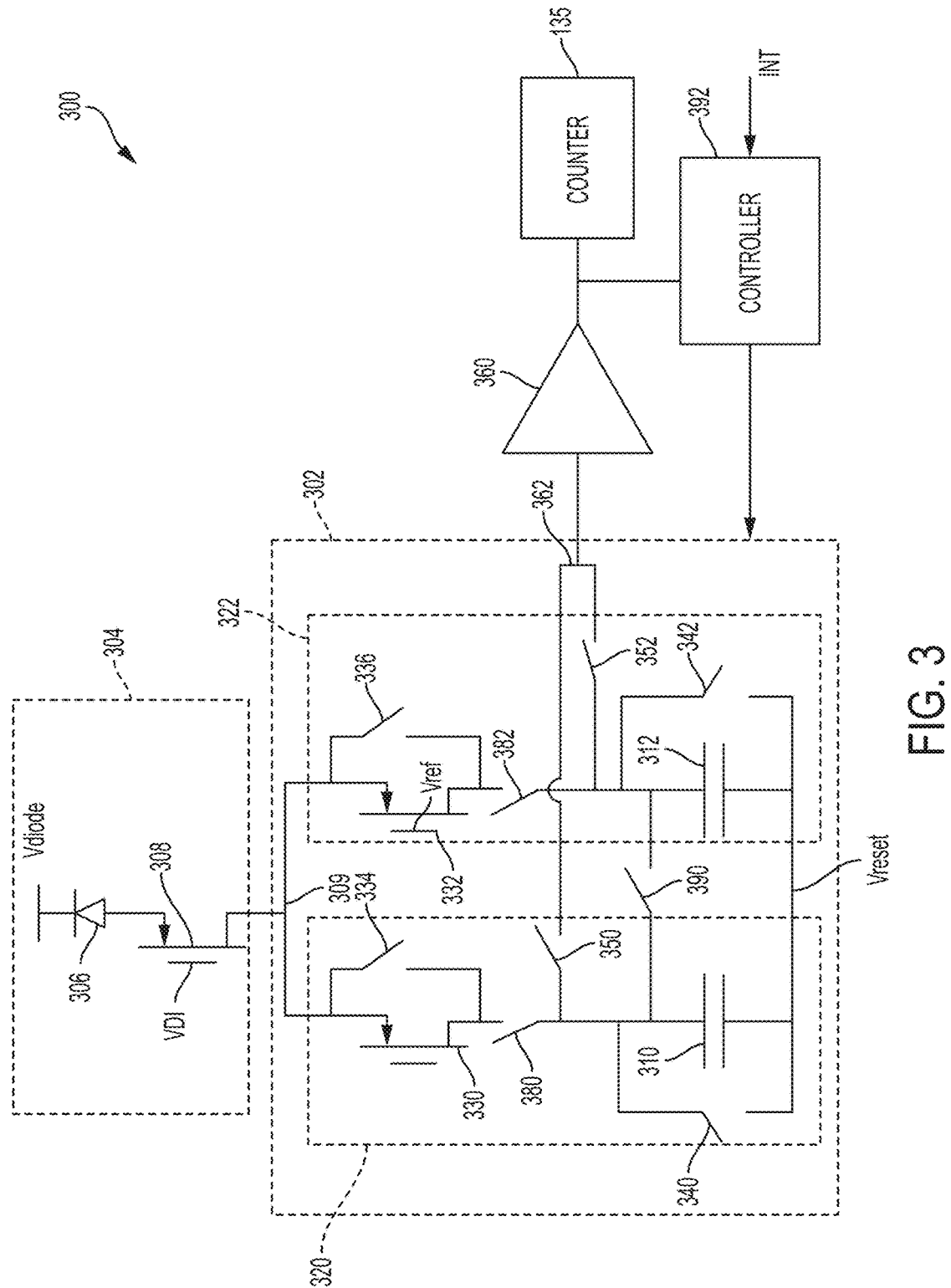
FIG. 3 is schematic diagram illustrating an integration capacitor network connected to a photo-current source and associated control and counting circuitry.

FIG. 3 shows an example of digital pixel system 300 according to one embodiment. The system 300 includes integration capacitor network 302 connected to photo-current source 304. As illustrated, the photo-current source 304 is a DI pixel that includes a photodiode 306 and an injection transistor 308. The injection transistor 308 has a bias applied to its gate of VDI as described above. Of course, any source of current may be utilized to provide a current to an input 309 of the capacitor network 302 as will be become apparent from the disclosure herein.

In FIG. 3, two paths are provided to allow for charging the first and second integration capacitors 310, 312. The two paths are generally shown as a first path 320 and second path 322. Each path includes a cascode transistor serially connected between the input 309 and an associated integration capacitor. In particular, the first path 320 includes a first cascode transistor 330 serially connected between the input 309 and the first integration capacitor 310 and the second path 322 includes a second cascode transistor 332 serially connected between the input 309 and the second integration capacitor 312. Each cascode transistor is biased to an integration level Vref. This Vref is chosen in the same manner as described in relation to FIG. 1 and sets a limit how much charge will be accumulated on one of the capacitors before the counter 135 is incremented and that capacitor is reset.

As illustrated, each integration capacitor 310, 312 is coupled between its associated cascode transistor 330, 332 and Vreset. In one embodiment, Vreset is ground but that is not required. In another embodiment that includes a CTIA, each integration capacitor 310, 312 is coupled between its associated cascode transistor 330, 332 and Vvirtualreset.

Each integration capacitor 310, 312 includes a reset switch 340, 342 coupled in parallel therewith and coupled to Vreset. Closing of a reset switch causes the charge subtraction from the integration capacitor it is associated with.

Each cascode transistor 330, 332 is shown as a PMOS transistor with the source connected to the input 309. Of course, the cascode transistors 330, 332 could be NMOS transistors in the event that a different type of detector 306 is used.

Regardless of the type of diode used, each cascode transistor 330, 332 includes a shorting path formed between its source and drain. Conduction through the shorting paths is controlled by shorting switches 334, 336 that are connected between the source and drain of its associated cascode transistor 330, 332.

Each path also includes an output connection switch 350, 352 that is used to couple a voltage accumulated by a particular integration capacitor 310, 312 to a comparator 360 through an output 362 of the network 302. To this end, the first output connection switch 350 is coupled between the drain of the first cascode transistor 330 and the output 362 and a second output connection switch 352 is coupled between the drain of the second cascode transistor 332 and the output 362. Similarly, the first output connection switch 350 is coupled between the first integration capacitor 310 and the output 362 and the second output connection switch 352 is coupled between the second integration capacitor 312 and the output 362.

Also included in FIG. 3 are secondary reset switches 380, 382 coupled between the first and second cascode transistors 330, 332 and the first and second integration capacitors 310, 312. These switches, in general, will operate in an opposite manner to the reset switches 340, 342 and serve to disconnect a particular integration capacitor from its associated cascode transistor when charge is being subtracted from the integration capacitor (e.g., during a reset to the capacitor).

In operation, charge entering the integration capacitor network 302 from the detector 306 (e.g., through the injection transistor 308 in FIG. 3) initially passes through one path (e.g., the first path 320) and charges the integration capacitor in that path (e.g., first integration capacitor 310). When the capacitor is charged to a level higher than Vref, charge is allowed to pass through the other path (e.g., the second path 322). This flow of charge into the other path will cause the comparator 360 to change state and counter 135 is incremented. Charge is then allowed to continue to accumulate in the integration capacitor of the other path (e.g., second integration capacitor 312) and the capacitor that was originally being charged is reset. The opposite operation to that just described then occurs and so on.

It will be understood that in order for the above described operation to happen, a controller 392 is provided that changes the configuration of the switches 334, 336, 340, 342, 350, 352 and 380, 382. The changes in the configuration happens at least in part based on the output of the comparator 360. The comparator 360 can include a reference voltage in one embodiment. In one embodiment, the comparator reference voltage is equal to or slightly (e.g, within 10%) higher than Vreset. In another embodiment, the comparator reference voltage is equal a voltage that is about halfway between Vreset and Vref.

The controller 392 can include an input to receive an integration signal (INT) that sets the time limit for integration. This is sometimes referred as the integration interval.

Figure 6:
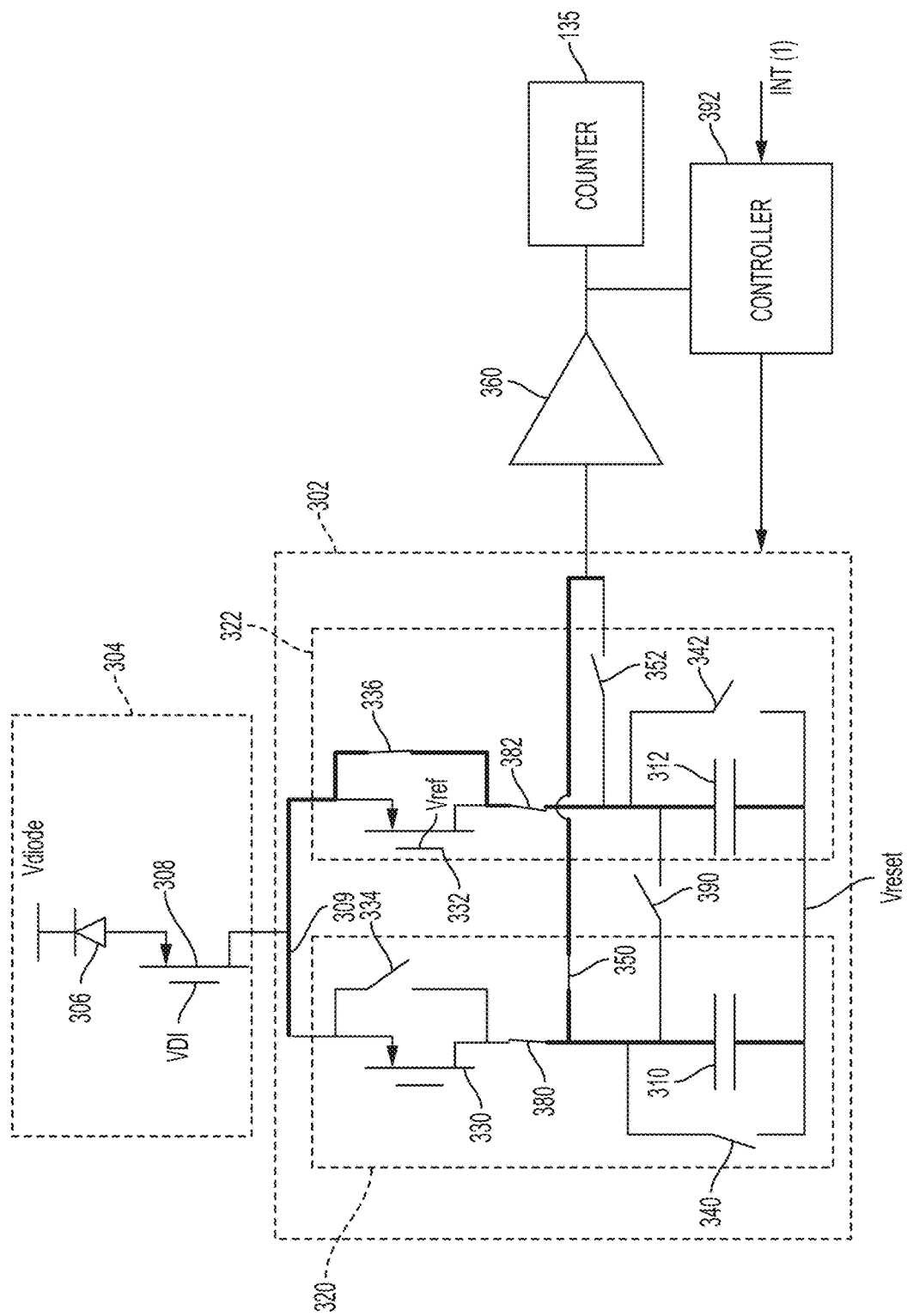
FIG. 6 is schematic diagram illustrating the integration capacitor network configured to store charge in the second integration capacitor and after the first capacitor has had charge subtracted from it.
Figure 7:
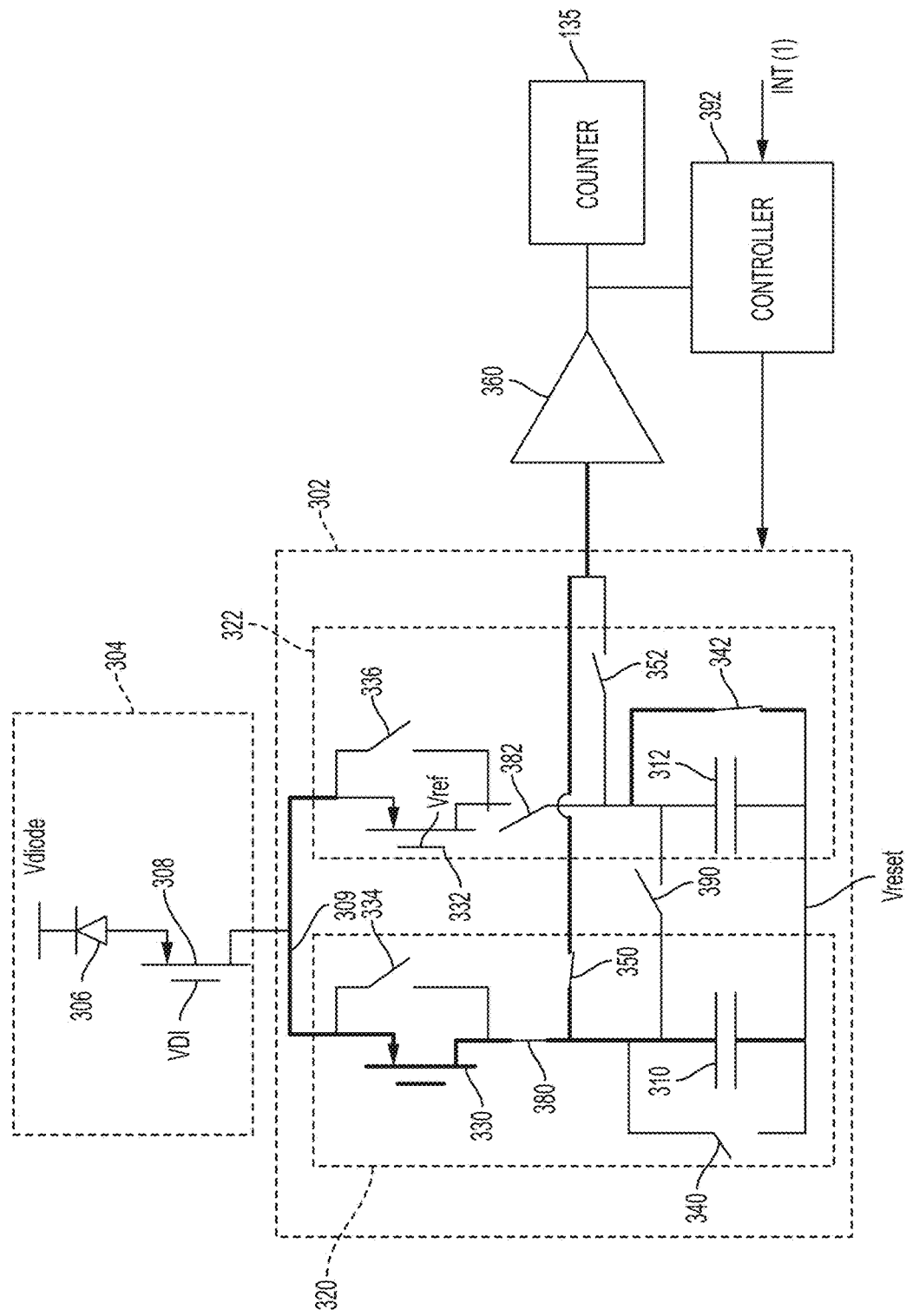
FIG. 7 is schematic diagram illustrating the integration capacitor network configured to again store charge in the first integration capacitor as the second integration capacitor is having charge subtracted from it.
Figure 8:
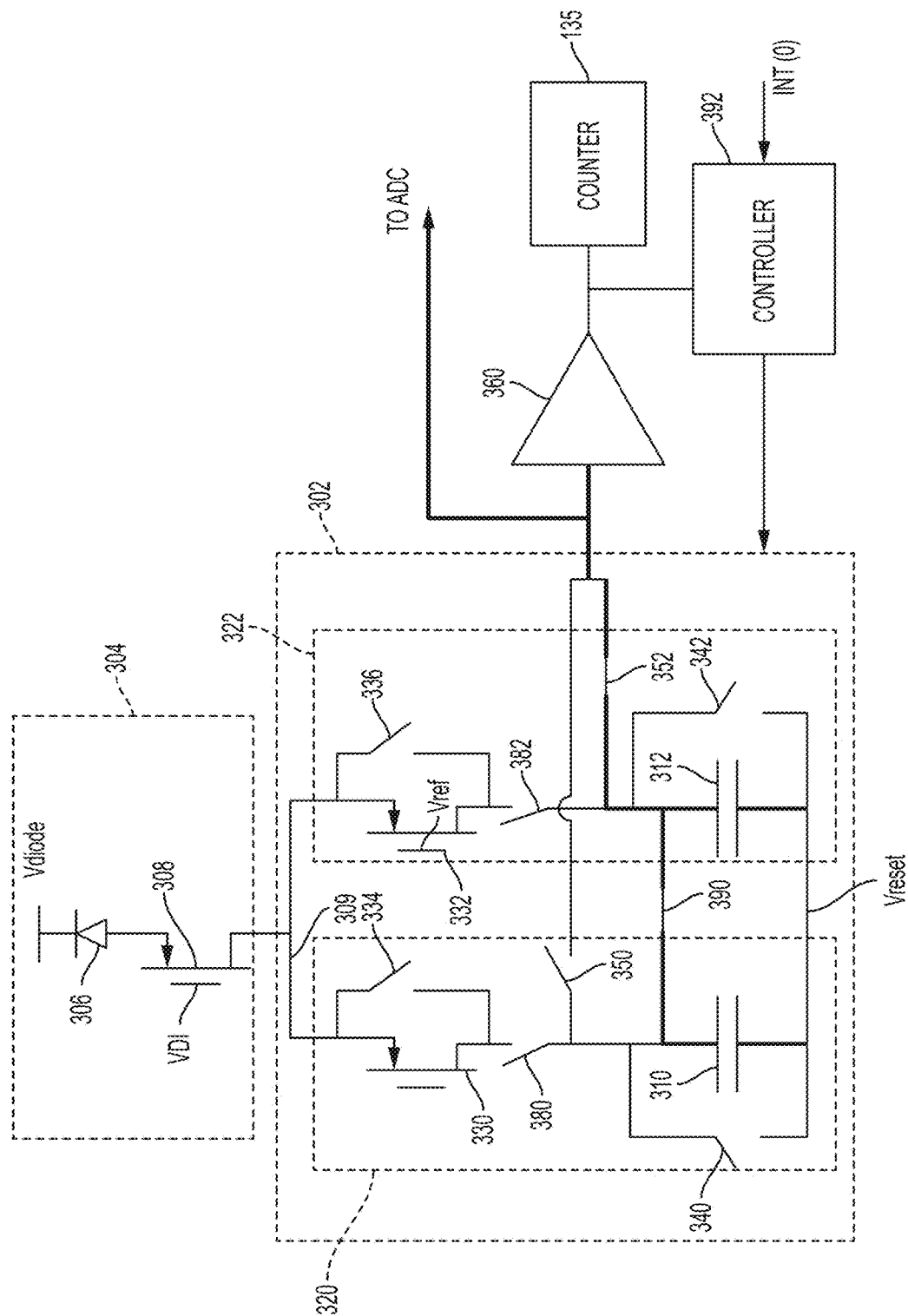
FIG. 8 is schematic diagram illustrating the integration capacitor network configured to allow for residual charge readout after expiration of an integration period.

Having thus described the general configuration, a method of operating the integration network 302 will now be described based on differing configurations thereof as shown in FIGS. 4-8. In the following figures, conduction paths that are current allowing for current flow are shown with bolder lines than those that are not. Also, it shall be understood that the integration signal INT is allowing for integration when it has the value (1) (FIGS. 4-7) and not when it has a value (0) (FIG. 8).

Figure 4:
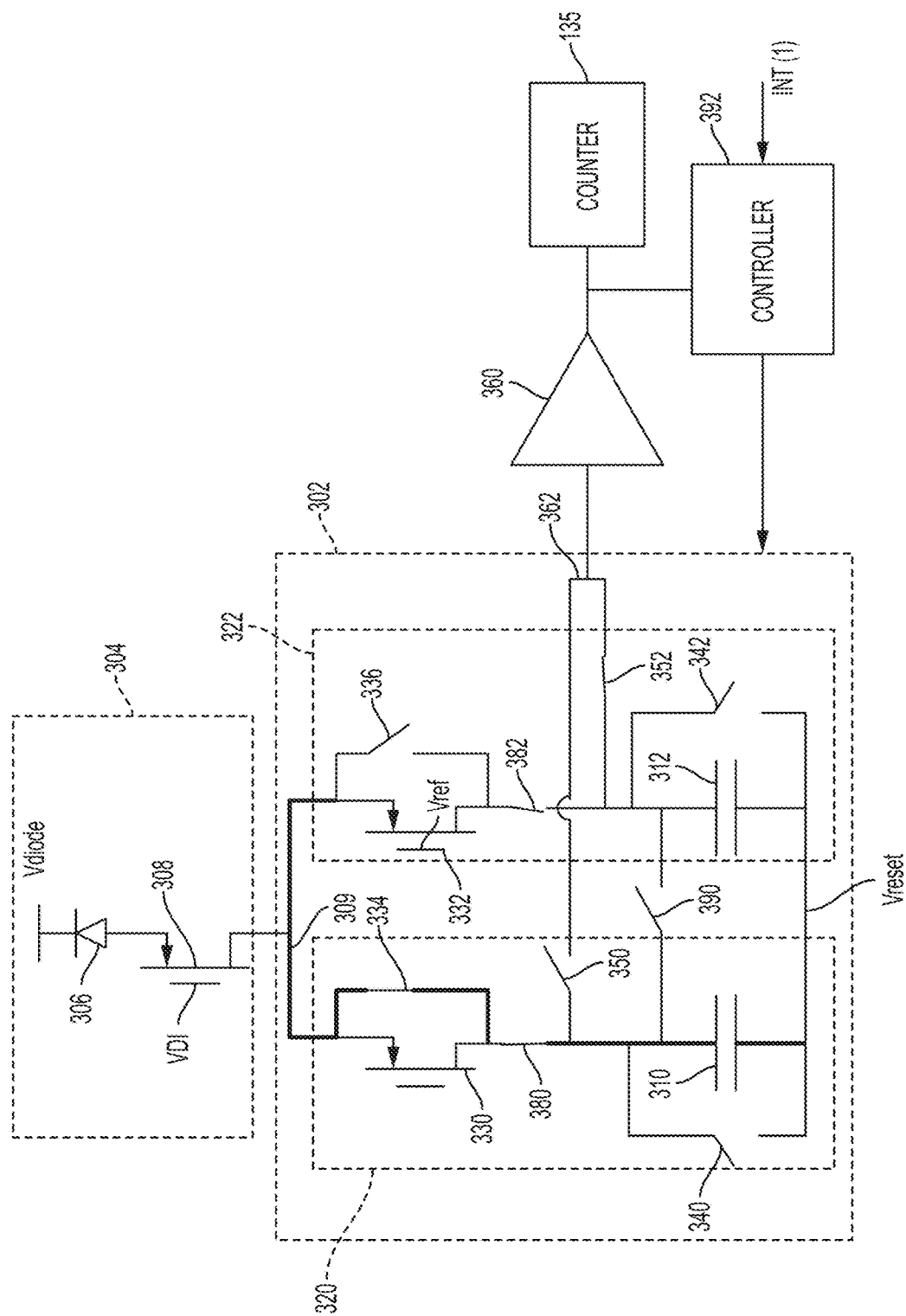
FIG. 4 is schematic diagram illustrating the integration capacitor network configured to store charge in a first integration capacitor.

In FIG. 4, the integration signal INT indicates that an integration period has started. The first shorting switch 334 is closed to allow for current to flow from the input 309 and accumulate on the first integration capacitor 310. In this first state, integration is allowed to happen on the first integration capacitor 310, the first reset switch 340 is open and the secondary reset switch 380 is closed. Further, as shown in FIG. 4, the second secondary reset 382 is also closed to allow for current flow through the second cascode transistor 332 when the voltage across the first integration capacitor 310 exceeds Vref.

Immediately following the closure of the first shorting switch 334, the voltage at input 309 is approximately equal to Vreset. As charge accumulates on the first integration capacitor 310, the voltage at input 309 will likewise increase. The second cascode transistor 332 does not allow for conduction therethrough until the voltage at input 309 exceeds the Vref (coupled to the gates of both the first and second cascode transistors 330, 332).

Figure 5:
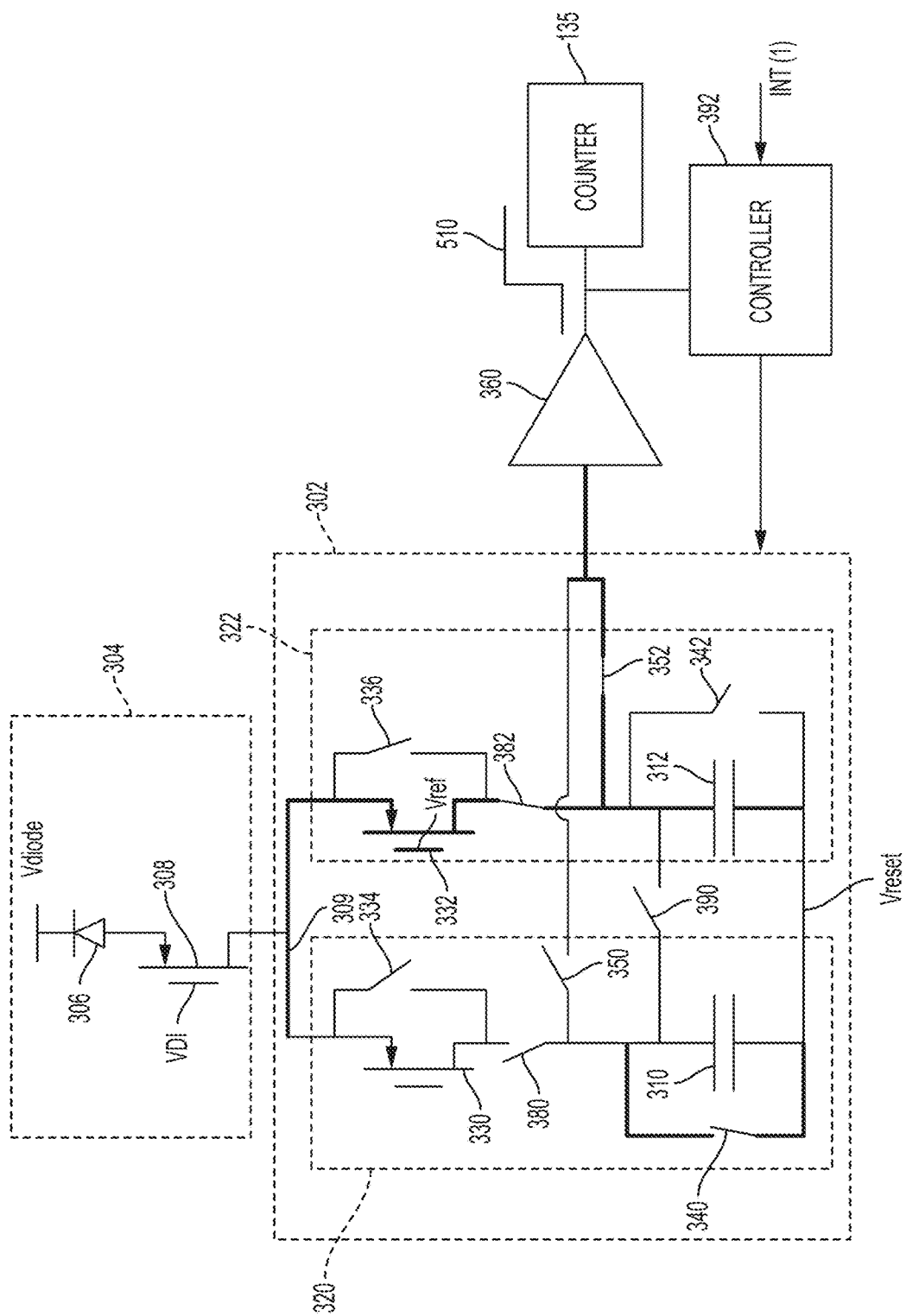
FIG. 5 is schematic diagram illustrating the integration capacitor network configured to store charge in a second integration capacitor.

After the voltage at input 309 exceeds Vref (e.g., the charge stored on the first integration capacitor 310 exceeds Vref), the second cascode transistor 332 allows for conduction of photo-current into the second integration capacitor 312. This is shown in FIG. 5. In both FIGS. 4 and 5, the second integration capacitor 312 is connected via the second output connection switch 352 to the comparator 360. After a voltage that is equal to the comparator threshold (e.g., greater than Vreset) is accumulated on the second integration capacitor 312, the output of comparator 360 changes state. This change (shown as a change from low-to-high in waveform 510 in FIG. 5) causes the controller 392 to subtract charge from the first integration capacitor 310. This occurs by closing the first reset switch 340 (and opening its associated secondary reset switch 380). At or around the same time, the first shorting switch 334 can be opened. It shall be understood that the opening of secondary reset switch 380 serves to stop charge accumulation in the first pathpath 320. The skilled artisan will realize that operating in this manner allows for constant current accumulation, and may help to remove or eliminate the charge not integrated during the resets events 210 of FIG. 2.

As discussed above, it takes a certain amount of time to remove charge from the first integration capacitor 310. Thus, the sizes of the capacitors can be selected such that the first integration capacitor 310 can discharge faster than the photo-current is expected to charge the second integration capacitor 312.

After a preset amount of time that is longer than required to remove charge from the first integration capacitor 310, the controller 392, as shown in FIG. 6, causes the configuration of FIG. 4 to be reversed. In particular, in FIG. 6, the integration signal INT remains high as the integration interval is ongoing.

The second shorting switch 336 is closed to allow for current to flow from the input 309 and accumulate on the second integration capacitor 312. In this second charging state, integration is allowed to happen on the second integration capacitor 312, the second reset switch 342 is open and the second secondary reset switch 382 is closed. Further, as shown in FIG. 6, the first secondary reset 380 is also closed to allow for current flow through the first cascode transistor 330 when the voltage across the second integration capacitor 312 exceeds Vref.

After the first cycle and immediately following the closure of the second shorting switch 336, the voltage at input 309 is approximately equal to Vreset. It will be understood that on the first cycle this voltage can approximately equal to the voltage stored on the second integration capacitor 312 at the time of closing the shorting switch 336.

Similar to the operation described above in FIG. 4, in FIG. 6 as charge accumulates on the second integration capacitor 312, the voltage at input 309 will likewise increase. The first cascode transistor 330 does not allow for conduction therethrough until the voltage at input 309 exceeds the Vref.

After the voltage at input 309 exceeds Vref (e.g., the charge stored on the second integration capacitor 312 exceeds Vref), the second cascode transistor 332 allows for conduction of photo-current into the first integration capacitor 310. This is shown in FIG. 7. In both FIGS. 6 and 7, the first integration capacitor 310 is connected via the first output connection switch 350 to the comparator 360. After a voltage that is equal to the comparator threshold (e.g., greater than Vreset) is accumulated on the second integration capacitor 312, the comparator 360 changes state. This change (shown as a change from low to high in FIG. 7) causes the controller 392 to subtract charge from the second integration capacitor 312. This occurs by closing the second reset switch 342 (and opening its associated secondary reset switch 382). At or around the same time, the second shorting switch 336 can be opened. It shall be understood that the opening of the secondary reset switch 382 serves to stop charge accumulation in the second pathpath 322.

In one embodiment, the operation shown in and described in relation to FIGS. 4-7 continues until the end of the integration interval. In another, integration can continue during readout. The following description describes operation as if readout occurs at the end of integration. The skilled artisan will realize that the same operation could occur at the beginning of a readout operation but while integration is still ongoing.

At the end of the integration interval, and as shown in FIG. 8 wherein INT has changed state (e.g., to a "zero" state), any residual charge in the first and second integration capacitors 310, 312 can be read out by shorting them together through residual output switch 390. In one embodiment, switches 334 and 336 are closed, allowing conduction during the read out. In another embodiment, both pathpaths 320, 322 are blocked from allowing charge to accumulate outside of the integration interval. This can be accomplished in any number of ways. As shown in FIG. 8 this can be accomplished by opening both secondary reset switches 380, 382. The ADC (not shown) can be any type of ADC including a single slope ADC.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

While the preferred embodiments to the invention have been described, it will be understood that those skilled in the art, both now and in the future, may make various improvements and enhancements which fall within the scope of the claims which follow. These claims should be construed to maintain the proper protection for the invention first described.

What is claimed is:

1. An integration capacitor network for connection to a photo-current source, the network comprising:
    an input;
    a first path connected between the input and a reset voltage, the first path including a first integration capacitor and a first cascode transistor, the first cascode transistor coupled between the input and the first integration capacitor; and
    a second path connected between the input and the reset voltage, the second path including a second integration capacitor and a second cascode transistor, the second cascode transistor coupled between the input and the second integration capacitor;
    wherein gates of the first and second cascode transistors are connected to a reference voltage; and
    wherein charge is accumulated on the first integration capacitor until a voltage on the first integration capacitor exceeds the reference voltage and then charge is accumulated on the second integration capacitor.

2. The integration capacitor network of claim 1, wherein the first path includes a first shorting switch that, when closed, short circuits a source and a drain of the first cascode transistor.

3. The integration capacitor network of claim 2, wherein the first path includes a first reset switch coupled in parallel with the first integration capacitor such that, when closed, the first reset switch causes charge to be subtracted from the first integration capacitor.

4. The integration capacitor network of claim 3, wherein the first path further includes a first secondary reset switch coupled between the first cascode transistor the first integration capacitor.

5. The integration capacitor network of claim 4, wherein the second path further includes:
    a second shorting switch that, when closed, short circuits a source and a drain of the second cascode transistor;
    a second reset switch coupled in parallel between with the second integration capacitor such that, when closed, the second reset switch causes charge to be subtracted from the second integration capacitor; and
    a second secondary reset switch coupled between the second cascode transistor the second integration capacitor.

6. The integration capacitor network of claim 4, further comprising:
    an output;
    a first output connection switch coupled between the first integration capacitor and the output; and
    a second output connection switch coupled between the second integration capacitor and the output.

7. The integration capacitor network of claim 1, further comprising:
    a residual output switch coupled between the first integration capacitor and the second integration capacitor.

8. A digital pixel comprising:
    a photo-current source;
    a comparator;
    a counter coupled to an output of the comparator;
    a controller coupled to the output of the comparator; and
    an integration capacitor network comprising:
        an input;
        a first path connected between the input and a reset voltage, the first path including a first integration capacitor and a first cascode transistor, the first cascode transistor coupled between the input and the first integration capacitor;
        a second path connected between the input and the reset voltage, the second path including a second integration capacitor and a second cascode transistor, the second cascode transistor coupled between the input and the second integration capacitor; and
        an output connected to the comparator;
        wherein gates of the first and second cascode transistors are connected to a reference voltage; and
    wherein the controller is configured to cause the integration capacitor network to accumulate charge on the first integration capacitor until a voltage on the first integration capacitor exceeds the reset voltage and then charge is accumulated on the second integration capacitor.

9. The digital pixel of claim 8, wherein the first path includes a first shorting switch that, when closed, short circuits a source and a drain of the first cascode transistor.

10. The digital pixel of claim 9, wherein the first path includes a first reset switch coupled in parallel between with the first integration transistor that, when closed, the first reset switch causes charge to be subtracted from the first integration capacitor.

11. The digital pixel of claim 10, wherein the first path further includes a first secondary reset switch coupled between the first cascode transistor the first integration capacitor.

12. The digital pixel of claim 11, wherein the controller is configured to cause:
    the first shorting switch and the first secondary reset to be closed while voltage on the first integration capacitor is below the reset voltage;
    the first reset switch to be open while the voltage on the first integration capacitor is below the reset voltage;

the first reset switch to close after the voltage on the first integration capacitor exceeds the reset voltage; and the first secondary reset switch to open after the voltage on the first integration capacitor exceeds the reset voltage.

13. The digital pixel of claim 12, wherein the second path further includes:
a second shorting switch that, when closed, shorts a source and a drain of the second cascode transistor;
a second reset switch coupled in parallel with the second integration capacitor such that, when closed, the second reset switch causes charge to be subtracted from the second integration capacitor; and
a second secondary reset switch coupled between the second cascode transistor the second integration capacitor.

14. The digital pixel of claim 13, wherein the controller causes:
the second secondary reset to be closed until a voltage on the second integration capacitor exceeds the reset voltage.

15. The digital pixel of claim 8, further comprising:
a first output connection switch coupling the first integration capacitor to the output after the voltage on the first integrating capacitor exceeds the reference voltage; and
a second output connection switch coupling the second integration capacitor to the output before the voltage on the first integrating capacitor exceeds the reference voltage.

16. The digital pixel of claim 1, further comprising:
a residual output switch coupled between the first and second integrating transistors that connects the first and second integrating transistors together and is closed after an integration period expires to couple both the first and second integrating transistors to the output to read out a residual charge on the first and second integrating transistors.

17. A method of operating a digital pixel, the method comprising:
storing charge from a photo-current source in a first integration capacitor until a voltage across the first integration capacitor exceeds a reference voltage;
storing charge from the photo-current source in a second integration capacitor after the voltage in the first integration capacitor exceeds the reference voltage; and
while storing charge in the second integration capacitor, subtracting voltage from the first integration capacitor.

18. The method of claim 17, wherein charge is stored in the second integration capacitor until a voltage across the second integration capacitor exceed the reference voltage.

19. The method claim 18, further comprising:
after subtracting voltage from the first integration capacitor storing charge from the photo-current source in the first integration capacitor after the voltage in the second integration capacitor exceeds the reference voltage; and
while storing charge in the first integration capacitor, subtracting voltage from the second integration capacitor.

20. The method of claim 18, further comprising:
after expiration of an integration period, stopping storing charge on both the first and second integration capacitors;
shorting the first and second integration capacitors together; and
reading out residual charge on the first and second integration capacitors.

* * * * *